(No Model.)
G. LEDER.
OIL MAT.
No. 274,128. Patented Mar. 20, 1883.
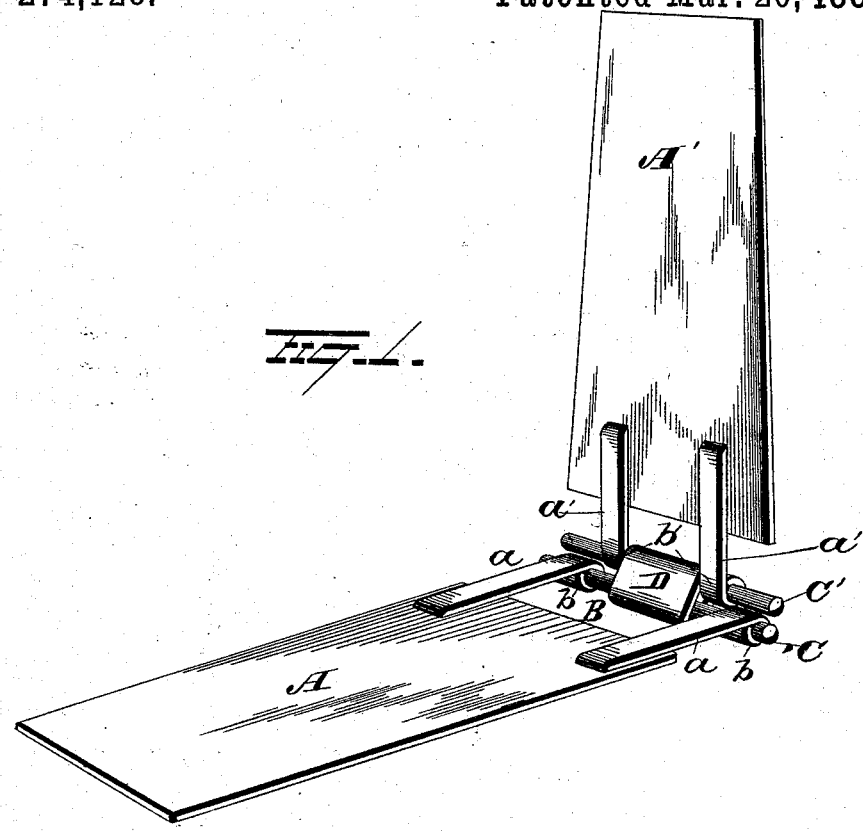
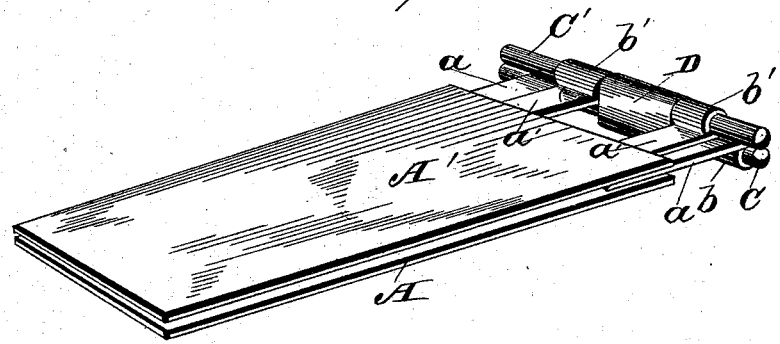
WITNESSES
George T. Downing
George W. Cook
INVENTOR
George Leder.
Attorney

UNITED STATES PATENT OFFICE.

GEORGE LEDER, OF DEMOPOLIS, ALABAMA.

OIL-MAT.

SPECIFICATION forming part of Letters Patent No. 274,128, dated March 20, 1883.

Application filed February 6, 1883. (No model.)

*To all whom it may concern:*

Be it known that I, GEORGE LEDER, of Demopolis, in the county of Marengo and State of Alabama, have invented new and useful Improvements in Oil-Mats; and I do hereby declare the following to be a full, clear, and exact description of the invention, such as will enable others skilled in the art to which it pertains to make and use the same.

My invention relates to an improvement in oil-mats adapted more particularly for use in expressing cotton-seed oil; and it consists in the parts and combinations of parts, as will be more fully described, and pointed out in the claims.

In the accompanying drawings, Figure 1 is a perspective view, showing the mat in open adjustment; and Fig. 2 is a similar view, showing the leaves closed.

This mat is made of any suitable metal, and consists of two leaves, A A', about one-eighth of an inch thick, and of any suitable size, loosely secured together at their rear or large ends by the combined hinge and handle B. The leaf A is provided at its rear or large end with two rearwardly-projecting arms, $a$, which latter terminate in bearings $b$ for the pintle C. These arms are situated near the outer side edges of the leaf A, while the arms $a$ of the leaf A' are situated nearer the center thereof, so as to come between the arms $a$ when the leaves are folded together. The arms $a'$ also terminate in bearings $b'$, in which the pintle C' is rigidly secured. When the leaves A and A' are closed together the pintles C C rest in the same plane, one above the other, and they are connected together by the flexible strap D, which latter is sufficiently large to enable the leaves of the mat, when the latter is charged or filled, to lie parallel, and is made of flexible material, so as not to interfere with the movement of the top leaf downward while in the press. The two inner arms, $a'$, are separated sufficiently to form a handle, which enables the mat to be handled with ease. The leaves comprising the mat are perfectly plain, having no side flanges which tend to tear or weaken the press-sacks into which the cotton-seed is packed before it is put into the mats.

The operation of my improvement is as follows: The cotton or other seed is first cleaned (ginned when necessary) and hulled, after which they are crushed and subjected to heat, for the purpose of expelling the dampness. The crushed and dried seed are then packed in sacks, placed between the leaves of the mats, which latter are then placed in a suitable press and subjected to pressure, during which the oil is pressed from the seed and runs into the box or into a receiver situated under or alongside the box.

The leaves of the mats are, by means of the hinge before described, enabled to retain their parallelism during the operation of pressing, thereby preventing the straining or injuring of the mats, and also enabling the pressure to be exerted evenly throughout the entire surface of the mats.

My invention is exceedingly simple in construction, is durable and effective in use, can be handled with ease, and can be manufactured at a small initial cost.

It is evident that slight changes and alterations in the several parts might be resorted to without departing from the spirit of my invention, and hence I would have it understood that I do not limit myself to the exact construction shown and described, but consider myself at liberty to make such changes as fairly fall within the spirit and scope of my invention.

Having fully described my invention, what I claim as new, and desire to secure by Letters Patent, is—

1. In an oil-mat, the combination, with two metal leaves, each having two rearwardly-projecting arms, which latter terminate in bearings, of pintles secured in the bearings and a flexible strap connecting the pintles.

2. In an oil-mat, the combination, with two leaves having rearwardly-projecting arms, arranged as shown, the ends of the arms terminating in bearings, of a pintle secured in bearings of the arms of one leaf, a second pintle secured in the arms of the second leaf, and a flexible strap connecting the pintles, substantially as set forth.

In testimony whereof I have signed this specification in the presence of two subscribing witnesses.

GEORGE LEDER.

Witnesses:
I. S. HARWELL,
A. C. BAILEY.